US006692715B2

(12) United States Patent
Barbeau

(10) Patent No.: US 6,692,715 B2
(45) Date of Patent: Feb. 17, 2004

(54) SILICA NANOFIBERS AND METHOD FOR PREPARING THEM

(75) Inventor: Claude Barbeau, Sainte-Foy (CA)

(73) Assignee: Mine Jeffrey Inc., Montréal (CA)

( * ) Notice: Subject to any disclaimer, the term of this patent is extended or adjusted under 35 U.S.C. 154(b) by 336 days.

(21) Appl. No.: 09/941,637

(22) Filed: Aug. 30, 2001

(65) Prior Publication Data

US 2003/0044339 A1 Mar. 6, 2003

(51) Int. Cl.$^7$ ............................................. C01B 33/18
(52) U.S. Cl. ..................... 423/335; 423/339; 588/242; 588/254
(58) Field of Search ........................ 423/335, 339, 423/167.1; 588/242, 254, 901

(56) References Cited

U.S. PATENT DOCUMENTS

| | | | |
|---|---|---|---|
| 4,824,878 A | * | 4/1989 | Sterzel ..................... 523/307 |
| 4,838,914 A | | 6/1989 | Ohta et al. |
| 5,516,973 A | | 5/1996 | Mirick et al. |
| 5,573,983 A | | 11/1996 | Nakamura et al. |
| 5,923,299 A | | 7/1999 | Brown et al. |
| 5,958,098 A | | 9/1999 | Heung |
| 5,968,740 A | | 10/1999 | Fodor et al. |
| 5,980,849 A | | 11/1999 | Ogata et al. |
| 5,989,510 A | | 11/1999 | Abe et al. |
| 6,005,185 A | | 12/1999 | Tange |
| 6,083,314 A | * | 7/2000 | Nakashima et al. ... 106/287.16 |
| 6,136,736 A | | 10/2000 | Rajaram et al. |
| 6,169,135 B1 | | 1/2001 | Chevallier et al. |
| 6,221,326 B1 | | 4/2001 | Amiche |
| 6,235,258 B1 | | 5/2001 | Muller et al. |
| 6,455,154 B1 | * | 9/2002 | Nakashima et al. ........ 428/359 |

OTHER PUBLICATIONS

<<Evaluation of chrysotile by chemical methods >>, C. Barbeau, Short course in Mineralogical techniques of Asbestos determination, Mineralogical Association of Canada, 1979, 197–212, no month.

* cited by examiner

*Primary Examiner*—Ngoc-Yen Nguyen
(74) *Attorney, Agent, or Firm*—Robic

(57) ABSTRACT

Disclosed are novel silica gel nanofibers having an outer diameter lower than 100 nm, a length of up to 1 cm, a specific surface area of from 600 to 1000 m$^2$/g and pore diameters of from 2 to 10 nm. Also disclosed are novel silica glass nanofibers having an outer diameter and a length similar to that of the above silica gel fibers. The silica gel nanofibers are prepared by reacting chrysotile in an aqueous solution containing a controlled-proton-releasing agent and cation-complexing agent, whereby the cations of the silicate are replaced by protons and dissolved, with production of solid fibrous and amorphous hydrated silica. The silica glass nanofibers are made by dehydrating the silica gel nanofibers at temperatures close to 1000° C. These nanofibers have numerous potential applications, especially due to their capacity to adsorb or absorb ions and metals, especially catalytically useful metals such as copper and silver.

12 Claims, 20 Drawing Sheets

SILICA GEL NANOFIBER X-RAY DIFFRACTOGRAM 100.00 nm

SILICA NANOFIBERS AND METHOD FOR PREPARING THEM

FIELD OF THE INVENTION

The present invention relates to new silica gel nanofibers and new silica glass nanofibers.

The invention also relates to methods for preparing such nanofibers from chrysotile asbestos.

BACKGROUND OF THE INVENTION

Nanometer scale fibers, filled or hollow, are of a great interest since the advent of carbon nanotubes.

Catalysis, separation, filling of plastic and optical communication are a few of the fields where the morphology of fibers plays an important role. These fields are also rich in applications where non-fibrous silica gel or silica glass is an active component. Silica nanofibers would therefore offer new possibilities of applications just like carbon nanotubes opened new avenues less than a decade ago.

It is well known that all silicates, whether natural or synthetic, react in water with acids, leading to the replacement of cations by hydrogen ions. The general formula of the end-product is $SiO_2 \cdot nH_2O$. Hydrolysis of many organic compounds containing silicon leads to the same end-product. Under diluted conditions silica acid ($SiO_2 \cdot 2H_2O$ or $Si(OH)_4$) can exist as a solute and a monomer in solution. However, under most conditions $SiO_2 \cdot nH_2O$ is a solid known as silica gel, having a polymeric structure consisting of chains, sheets or three-dimensional networks. Firing of silica gel gives silica glass.

U.S. Pat. No. 5,980,849 discloses a method for preparing three-dimensional mesoporous material by incorporating a surface-active agent in the sheet structure of silica gel obtained from acid attack on natural silicates. This method provides specific surface area of 500 $m^2/g$ or less.

U.S. Pat. No. 6,169,135 discloses a method for preparing powder, beads or granules of silica having specific surfaces up to 240 $m^2/g$, by acidifying silicates with strong or weak acids. Silica particulates with specific surface up to 300 $m^2/g$ and mean pore diameter ranging from 10 to 50 nm are the result of reactions between silicates and acids in water (see also U.S. Pat. No. 5,968,470).

U.S. Pat. Nos. 5,989,510 and 6,235,258 disclose methods for preparing silica solids having a surface area of up to about 800 $m^2/g$ by means of polymeric substances and acid neutralisation of silicates. These solids are amorphous, granular, spherical or of undefined morphology.

U.S. Pat. No. 6,221,326 discloses a method for preparing hollow silica particles, which consists in precipitating active silica on a core followed by its elimination, thus leaving a silica shell.

U.S. Pat. No. 4,838,914 discloses a method is also known to produce silica glass fibers from spinning a silica sol solution and sintering the gel fibers. The diameter of the so prepared fibers is of about 20 $\mu m$. Mesoporous silica fibers can also be made by a spinning process (see U.S. Pat. No. 5,923,299) with diameter of the order of 40 $\mu m$ and high specific surface.

U.S. Pat. No. 5,573,983 discloses a method for preparing fine silica tubes from a reaction involving a synthetic silicon compound and an acid. The so prepared silica gel tubes and silica glass tubes have diameters of 50 to 2000 nm and lengths of up to 500 $\mu m$.

U.S. Pat. No. 5,958,098 discloses a method by which metal hydride particles are embedded in a silica network.

U.S. Pat. No. 6,136,736 discloses a method for preparing silica glass doped with many elements.

The large number of existing patents pertaining to silica products shows the importance of silica material having high surface area, chemical and thermal stability, and special morphology. The availability of silica nanofibers should therefore be welcome. If such nanofibers were also abundantly and economically produced, numerous applications could be developed.

Indeed, small diameter fibers are recognized to be more effective in applications such as strengthening and filtration. Silica gel and silica glass nanofibers would therefore expand the field of applications of granular silica gel and silica glass.

A natural silicon-based nanofiber is chrysotile asbestos. This mineral a fibrous silicate mineral, as are other asbestiform silicates like amosite, crocidolite and anthophyllite. The chemical composition of chrysotile is $Mg_6(OH)_8 \cdot Si_4O_{10}$.

The reactivity of chrysotile asbestos in the presence of acids, complexing agents and inorganic salts is well documented. For example, chrysotile is known to decompose in hydrochloric acid to magnesium ions and amorphous gel-like silica. In this connection, reference can be made to the following disclosure and Master theses available at Université Laval:

"Evaluation of chrysotile by chemical methods", C. Barbeau, Short course in Mineralogical techniques of Asbestos determination, Mineralogical Association of Canada, 1979, 197–212;

"Étude de la réactivité du chrysotile", L. Gendreau, Master thesis, Université Laval, 1985, 92 pages;

"Dissolution séquentielle des feuillets du chrysotile en milieu acide", C. deBlois, Master thesis, Université Laval, 1987, 143 pages; and "Adsorption de métaux de transition sur l'amiante chrysotile", L. Dussault, Master thesis, Université Laval, 1990, 106 page).

Partial decomposition of chrysotile occurs in aqueous and weakly acidic solutions, thereby producing soluble silicic acid and magnesium ions. The remaining solid retains the original morphology and chemical composition, but the diameter of the fibers is usually reduced.

U.S. Pat. No. 5,516,973 discloses a method to destroy the crystal structure and the fibrous nature of the chrysotile asbestos, which consists in spraying a water solution of a weak acid onto asbestos-containing material.

U.S. Pat. No. 6,005,185 also discloses a method which makes use of a fluoro acid agent for converting chrysotile asbestos material to environmentally benign components. In the latter case, the tubular silicate structure is transformed to an open and unrolled silica product.

SUMMARY OF THE INVENTION

The present invention is based on the discovery that chrysotile asbestos can be converted to silica gel without loss of its tubular morphology. Such a discovery is of a great interest inasmuch as it permits to obtain fibers having a length of up to several millimeters and a diameter of less than 100 nanometers. Moreover, the so-obtained nanofibers of silica gel may thereafter be converted by firing into nanofibers of silica glass. Such new nanofibers can be produced at low cost and have numerous industrial applications due to their unique morphology.

More specifically, the invention is based on the discovery that by heating chrysotile in an aqueous solution containing the reactive combination of a controlled-proton-releasing agent and a cation-complexing agent, one may replace and dissolve the cations of the silicate by protons and thus obtain solid fibrous, amorphous hydrated silica also called "silica gel nanofibers". The so-obtained silica gel nanofibers may thus be converted to silica glass nanofibers by deshydration at a temperature of 900 to 1200° C., preferably close to 1000° C.

Thus, a fist object of the invention is to provide a method for preparing silica gel nanofibers comprising the step of heating a chrysotile asbestos in an aqueous solution containing at least one controlled-proton-releasing agent and at least one cation-complexing agent, and subsequently recovery the silica gel nanofibers that have been prepared from the aqueous solution.

A second object of the invention is to provide silica gel nanofibers of improved structure. These fibers which may be obtained by the above mentioned method, have an outer diameter lower than 100 nm, a length up to 1 cm, a specific surface area of from 600 to 1000 $m^2/g$ and pore diameters of from 2 to 10 nm.

A third object of the invention is to provide a method for preparing silica glass nanofibers, comprising of the step of heating the above silica gel nanofibers at a temperature of 900° C. to 1200° C.

A fourth object of the invention is to provide silica glass nanofibers of improved structure. These fibers which can be obtained by the above-mentioned method, have an outer diameter and a length similar to that of the above silica gel fibers.

The so obtained silica gel and silica glass nanofibers have numerous potential applications, especially due to their capacity to adsorb or absorb ions and metals, especially catalytically useful metals such as copper and silver.

The invention and the way it can be reduced to practice will be better understood upon reading the following non-restrictive detailed description.

DETAILED DESCRIPTION OF THE INVENTION

In the following description and appended claims, the term "nanofibers" applies to elongated structures, either solid or hollow, having a cross section or diameter of less than 200 nanometers (usually from about 5 to 100 nanometers) and a length of about 1 micron to about 1 centimeter.

The term "silica" as used herein, refers to a solid form of silicon oxide of stoichiometry equal to or close to $SiO_2$, with a purity greater than 90%.

The term "silica gel" as used herein, refers to a solid form of amorphous silica, which contains hydrated water or hydroxyl groups.

The term "silica glass" as used herein, refers to a solid form of amorphous silica, which is free of water.

As aforesaid, the present invention is based on the discovery that by heating chrysotile asbestos, in an aqueous solution containing the reactive combination of a controlled-proton-releasing agent and a cation-complexing agent, one may replace and dissolve the cations of the silicate by protons and thus obtain solid fibrous and amorphous hydrated silica. The so-obtained silica gel nanofibers may then be converted into silica glass nanofibers by deshydratation at a temperature higher than 900° C.

Chrysotile asbestos which is used as starting material, is known to have a regular crystalline structure resulting from cylindrical or spiral arrangement of alternating layers of magnesium hydroxide and silicon oxide with oxygen atoms bounding the layers and sharing the two chemical entities. The chrysotile fibers have an inner diameter that can be less than 10 nanometers and an outer diameter from 30 to 200 nanometers. Since they are long (up to 1 centimeter) and flexible, the fibers tend to tangle. The central portion of the fibers surrounded by the inner diameter may be hollow or filled.

The presence of iron ions as substitute for magnesium ions and the curvature stress brought by the inequality of surface area of the magnesium hydroxide and silicon oxide layers are responsible for stability differences in the cylindrical tubes making up chrysotile fibers. The lack of high stability renders a number of cylindrical tubes labile in presence of chemical reagents. Thermodynamic stability also plays a role in the transformation of chrysotile into antigorite and brucite at temperatures above 250° C.

In solutions containing only proton-liberating compounds, the magnesium hydroxide layer of chrysotile reacts with hydrogen ions, producing magnesium ions and water, and causing a disappearance of the magnesium-containing layer. The oxygen atom shared between a magnesium atom and a silicon atom reacts with a hydrogen ion to give a hydroxyl group. Destruction of the silicon oxide layer takes place with production of silicic acid. By controlling the conditions for the hydrogen ion attack, stepwise double layer leaching can be obtained. In solutions containing only magnesium-complexing agents, stepwise leaching of chrysotile dissolves both layers, producing magnesium complexes and silicic acid.

The destruction of the silicon oxide layer results from the breakage of one or more links of the type Si—O—Si. In order to dissolve magnesium ions without causing the destruction of the silicon oxide layer, the multiple Si—O—Si bond should be preserved or left to rearrange without breaking. Conditions should therefore be controlled for dissolving magnesium and iron ions without provoking a modifying reaction with silicon oxide.

In accordance with the invention, it has surprisingly be discovered that a reaction combination containing a control proton-releasing agent, especially a weak hydrogen ion releasing compound, and a selective cation complexing agent, is effective when reacted with chrysotile under certain conditions inasmuch as it causes a leaching and total dissolution of the metal cations in chrysotile, while leaving a skeleton of silicon oxide with the overall original morphology of chrysotile.

As aforesaid, the first component of the reactive combination is a controlled proton-releasing agent. Such an agent is preferably a "weak" hydrogen ion releasing compound, that is a compound having a dissociation constant that ranges between about 4 and 7 on the $pK_a$ scale. Organic acids such as acetic or ascorbic acid, organic salts such as hydrogen citrate or hydrogen oxalate or inorganic salts such as ammonium chloride or hydroxylamine sulphate can be used for controlled leaching of the chrysotile. It is worth noting that leaching of the chrysotile must be kept over 30% and the solution must be sufficiently diluted so silicic acid remains in solution and does not polymerise to granular silica gel.

The second component of the reactive combination is a chemical agent able to complex divalent and trivalent transition metal cations found in chrysotile. The complex that is formed must be water soluble and possess an effective dissociation constant greater than about 5 on the pK scale, for the pH condition established for or by the first component. Polydendate ligands such as ethylene-dinitrilo-tetraacetate, nitrilo-tetraacetate or oxalate are preferably used as such ligands.

The reaction is carried out in an aqueous solution at a temperature in the range of 60 to 100° C. The pH of the solution must be maintained between 2 and 6, preferably between 3 and 5, ideally close to 4. The weight ratio chrysotile:water must be in the range 1:1000 to 5:1000.

In practice, the first component is preferably added in such an amount that the available hydrogen ions are at least 100 times the number of magnesium ions in the chrysotile sample, and in amount sufficient to insure that the pH of the solution will not fluctuate by more than one unit during the course of the reactions. The second component is added in such an amount that it exceeds by a factor of 3 to 10 the quantity of transition metal ions in the chrysotile sample.

The solution is heated at the same pre-established temperature for a period of time lasting between 7 to 20 hours. Longer reaction time does not modify the end product, neither in quality nor in yield. After filtration, the solid residue is digested in hydrochloric acid in order to completely dissolve any non-reacted chrysotile fiber and traces of accompanying metallic oxides. The yield of silica gel nanofibers amount to 15 to 35% of the amount of initial chrysotile.

The silica gel nanofibers that are so obtained are of the formula $SiO_2 \cdot xH_2O$, where x is close to 1 in samples dried at 120° C., and decreases to less than 0.2 in samples heated at 800° C. The purity of $SiO_2$ is greater than 99%.

These silica gel nanofibers show none of the X-ray diffraction peaks belonging to chrysotile. The presence of only a large band at a 2-theta angle of about 24 degrees, without diffraction peaks, is indicative of an amorphous state.

These silica gel nanofibers also show infrared signals corresponding to Si—O—Si fundamental vibrations at about 1100 $cm^{-1}$. The characteristic signal close to 3650 $cm^{-1}$, which is associated to the hydroxyl group linked to magnesium in chrysotile, is totally absent from all silica gel nanofiber samples. The O—H stretching and bending vibrations bands associated with adsorbed water or surface hydroxyl groups are present in all silica gel nanofiber samples in the expected regions of about 3500 and 1650 $cm^{-1}$.

As aforesaid, the silica gel nanofibers according to the invention have a high specific surface area in the range of 600 to 1000 $m^2/g$, as determined by BET method. The pore diameter is very narrowly distributed around 4 nm. The only difference in the nanofibers heated at 500° C. as compared to those dried at 120° C. comes from a lower specific surface area.

The capacity of the silica gel nanofibers according to the invention to adsorb or absorb metallic ions and metals has been demonstrated by impregnation testing carried out under different wet conditions. Transitions metal ions can be impregnated in acid or alkaline solutions to loadings of more than 10% and subsequently be reduced to metals. Copper and silver demonstrate how other catalytically useful metals could be deposited in and on the silica gel nanofibers.

The morphology of the silica gel nanofibers, as observed under scanning electron microscopy, is the same for all samples including those heated at 500° C. Whether they are linear or twisted and/or small or large, the bundles of fibers reveal that the diameter of the individual fibers is in the nanometer range, whereas their length is in the millimeter range.

As a matter of fact, the silica gel nanofibers according to the invention as observed under high-resolution transmission microscopy, show identical morphology in terms of their diameter and their regular and parallel arrangement in the formation of bundles.

The invention is also directed to a method of preparing silica glass nanofibers. This method is based on the discovery that by slowly heating the above mentioned silica gel nanofibers up to 900 to 1200° C., preferably 1000° C., for 4 to 15 h, preferably 12 h, one may cause total loss of water and transformation of said fibers into silica glass nanofibers. Rapidly heating silica gel fibers at 1000° C. also causes loss of water and production of silica glass, but the fiber structure may be partially or totally loss due to the bursting that can take place when water is expelled.

The chemical composition of the silica glass nanofibers is $SiO_2$ with a purity of more than 99% in $SiO_2$.

The infrared spectrum of the silica glass nanofibers differs from that of the silica gel nanofibers by the absence of any O—H vibration band. Only signals related to Si—O—Si and similar to those in quartz are present.

The silica glass fibers according to the invention are slightly porous as evidenced by the results of BET measurements that give a specific surface area close to 10 $m^2/g$. This results together with pore diameters evaluated at about 4 nm could indicate a residual porosity from silica gel fibers.

The silica glass nanofibers infrared spectrum obtained by rapid firing may differ from the silica gel nanofibers, breaking in smaller fibers, or adopting a more columnar shape, as revealed by scanning electron-microscopy. Silica glass nanodebris seemingly produced by the bursting of fibers sometimes accompany silica glass nanofibers. Their structure is markedly different as can be seen by scanning electron or high-resolution transmission microscopy.

The morphology of the silica glass nanofibers obtained by controlled heating does not differ from that of the silica gel nanofibers, as evidenced under scanning electron microscopy. The same appearance in length, structure and diameter indicate that the transformation from gel to glass with loss of water has not caused a major morphology change.

The silica glass nanofibers appear not to differ from glass fibers in their hardness and brittleness.

It is worth noting that modification of the structure of the silica glass nanofibers is possible by processes implying embedded chemicals as will be exemplified hereinafter by a test with silver (see example 7).

The capacity of the silica glass nanofibers to encapsulate chemicals such as metals will also be exemplified hereinafter by a test performed with copper (see example 8).

The following examples made with reference to the accompanying drawings will better illustrate the invention.

EXAMPLES

Example 1

Figure 1:
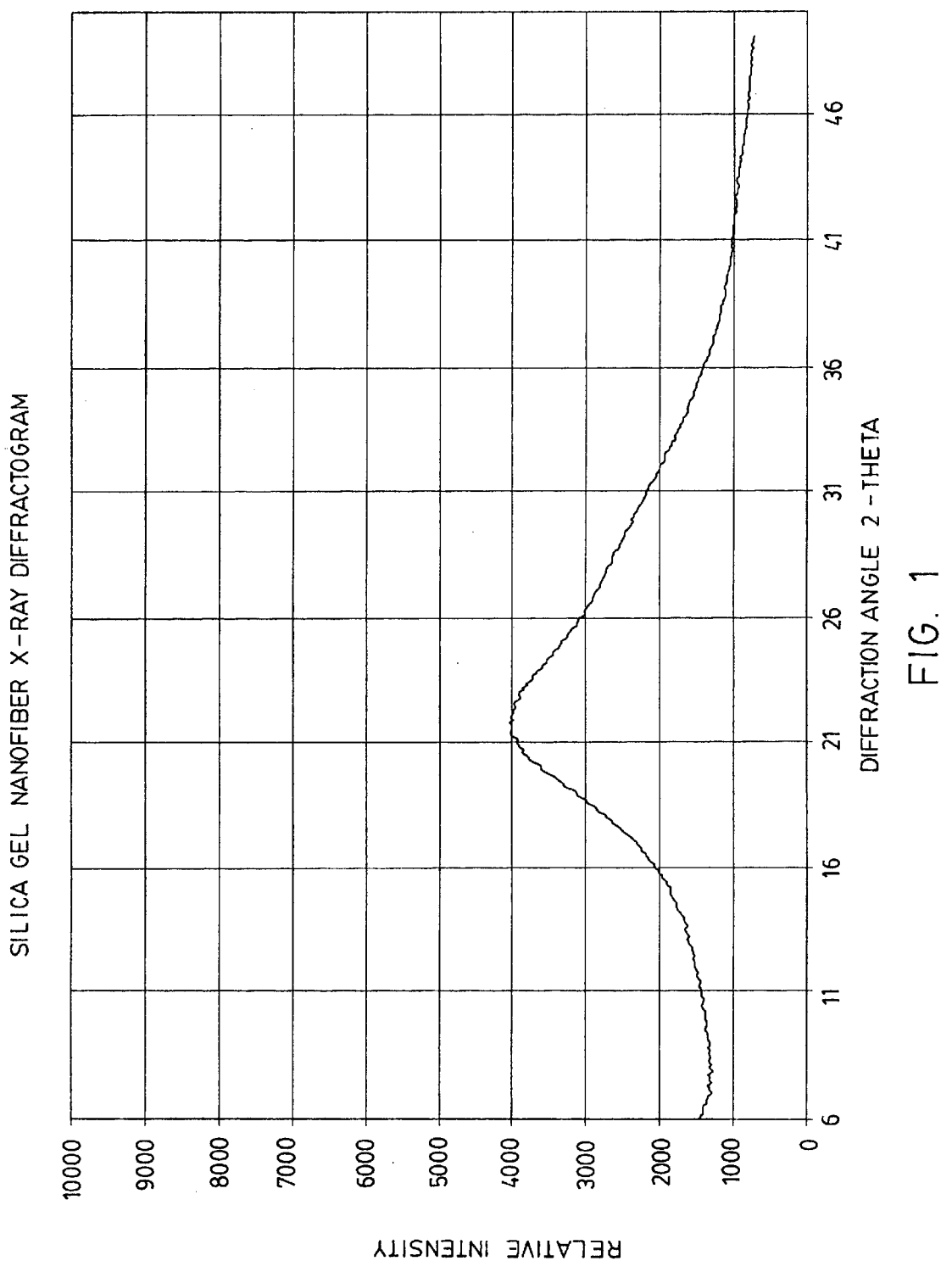
FIG. 1 is an X-ray diffraction pattern of the silica gel nanofibers obtained in Example 1.

3 g of crude, greenish and lustrous chrysotile fibers hand selected from a perpendicular native vein in an ore sample from Mine Jeffery, Québec, Canada, were dispersed in 1500 mL of water containing 304 g of hydroxylamine hydrochloride (CAS Registry Number: 5470-11-1) and 1 g of ethylene-dinitrilo-tetraacetic acid (CAS Registry Number: 60-00-4). The solution was heated under reflux at 100° C. during 16 hours. The resulting white solid material was filtered over a 0.45 μm polycarbonate filter and dried under vacuum at 20° C. The final product had the same fibrous appearance as the initial product. The yield was 0.6 g.

The white solid was digested in 0.1 M hydrochloric acid at 100° C. during 1 hour, without loosing more than 10% in weight. Total dissolution of the remaining white solid occurred under a mixture of hydrochloric and hydrofluoric acid. Elemental analysis gave a chemical composition of $SiO_2 \cdot H_2O$ with only traces of iron (3600 ppm) and magnesium (90 ppm). Thus, the so-obtained product actually consisted of silica gel nanofibers.

The X-ray diffraction pattern was measured using the K-alpha line from Cu anticathode. This diffraction pattern as shown in FIG. 1 contains no sharp signals at a 2-theta angle of about 12 degrees, which is the strongest peak in a diffractogram of a chrysotile sample.

Figure 2:
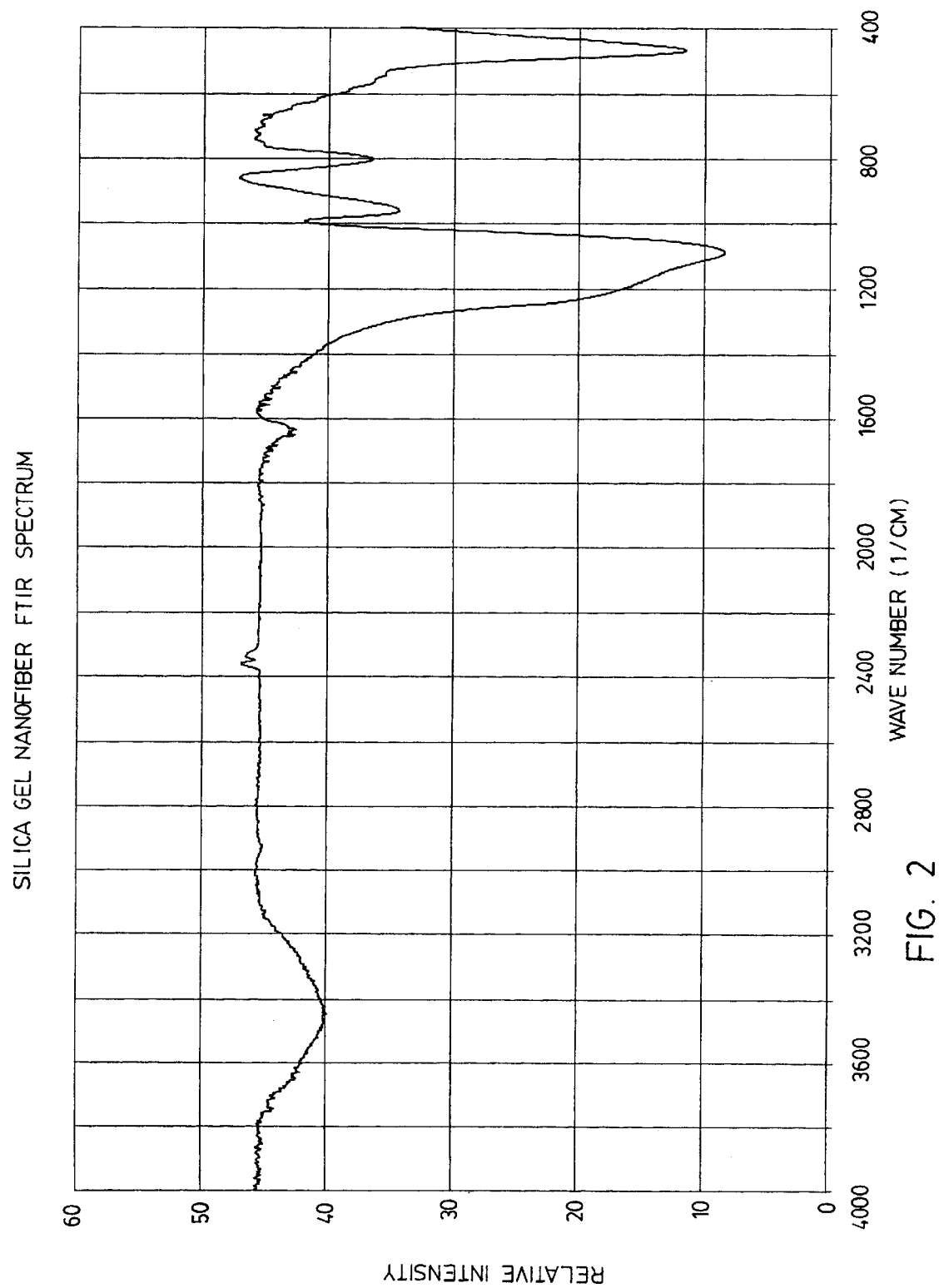
FIG. 2 is an infrared spectrum of the silica gel nanofibers obtained in Example 1.

Infrared analysis of the obtained silica gel nanofibers revealed the presence of two groups of bands as shown in FIG. 2 the first group is assigned to amorphous silica gel at wavenumbers close to 470, 800, 950 and 1100 $cm^{-1}$; the second group is assigned to water at about 1650 and 3500 $cm^{-1}$.

The adsorption-desorption of nitrogen on the so-obtained silica gel nanofibers provided data from which the specific surface area was calculated as being equal to 985 $m^2/g$. Most of the pore diameters were ranging between 3 and 4 nm.

Figure 3:
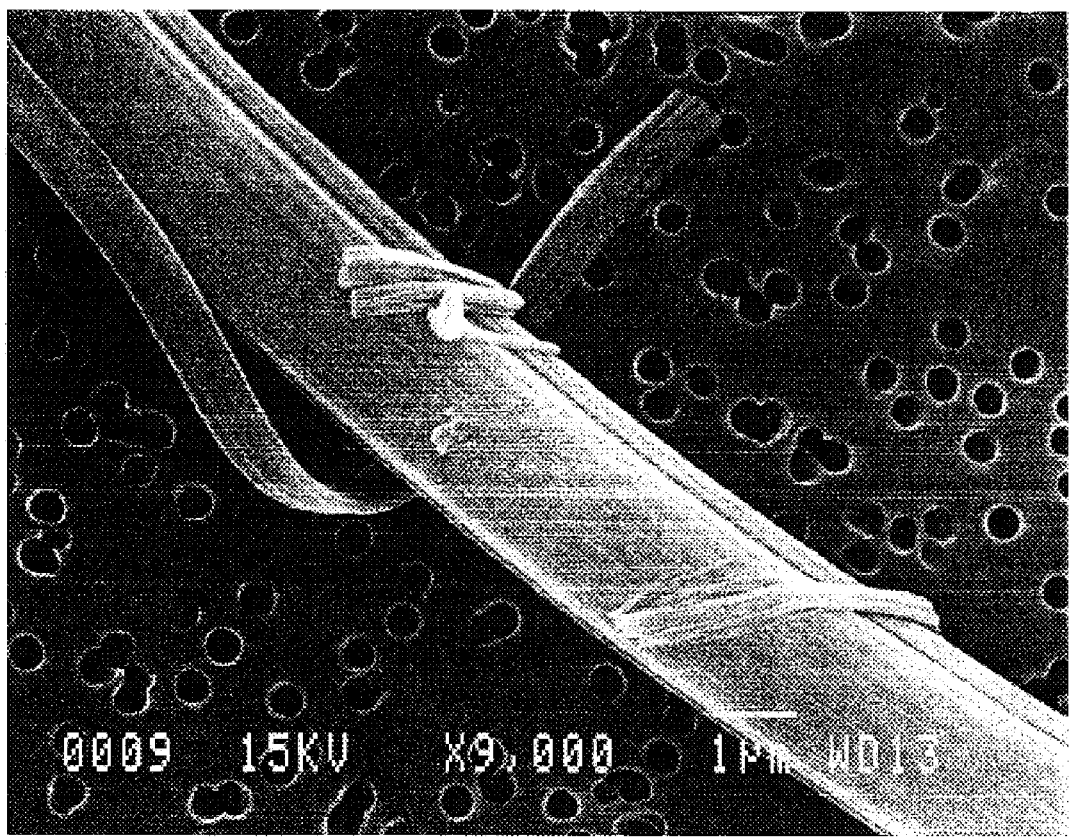
FIGS. 3 and 4 are scanning electron micrographs of a bundle of the silica gel nanofibers obtained in Example 1.

The scanning electron micrograph of FIG. 3 shows bundles of the resulting silica gel nanofibers. The widths of the bundles are less than 1 μm and the lengths are many times the widths. The end of a bundle shown in FIG. 4 reveals the presence of many nanofibers having diameters in the nanometer range.

Figure 5:
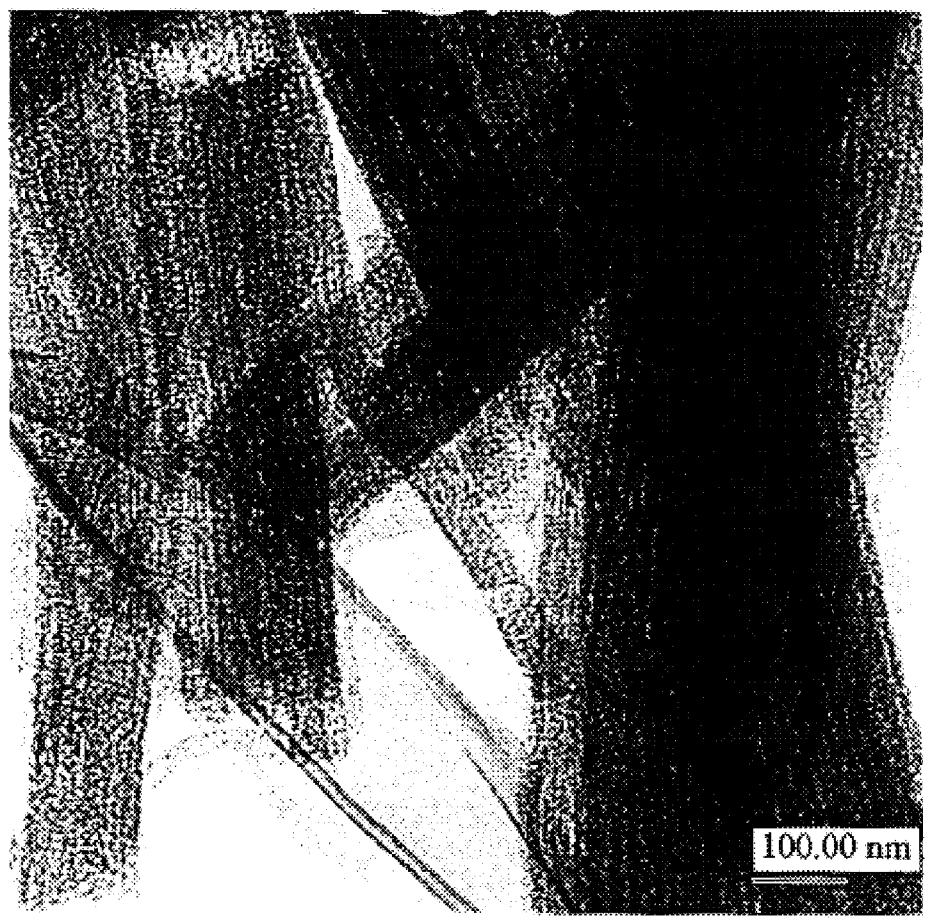
FIGS. 5 and 6 are high resolution transmission electron micrographs of a bundle of the silica gel nanofibers obtained in Example 1.
Figure 6:
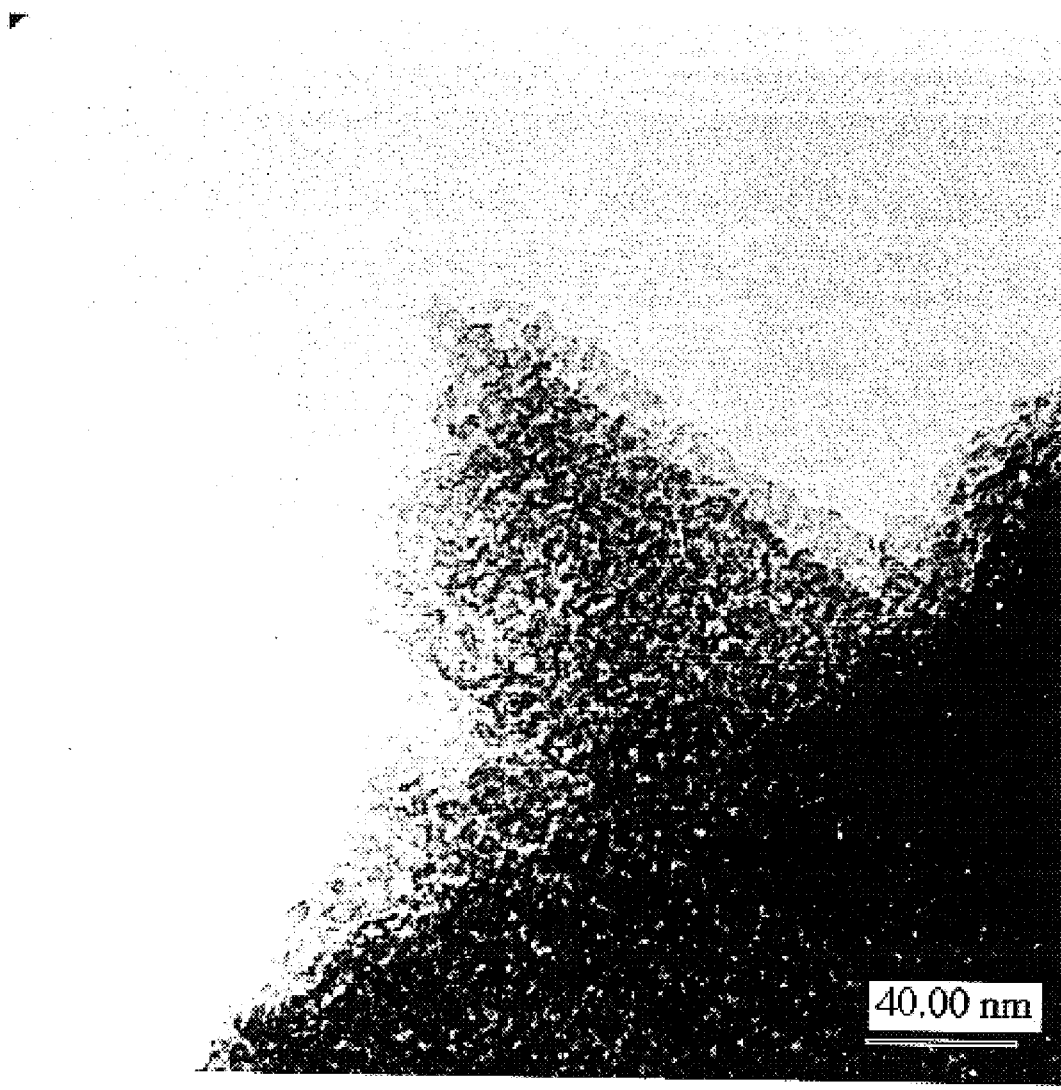

The high-resolution transmission electron micrograph of a bundle of silica gel nanofibers is given in FIG. 5. The straight and parallel nanofibers are amorphous and have approximately a same diameter of about 20 nm. The morphology of the individual nanofiber is more evident in the high-resolution transmission micrograph shown in FIG. 6.

Example 2

3 g of commercial grade No. 4 milled chrysotile asbestos was randomly taken from a large quantity supplied by Mine Jeffrey, Quebec, Canada. The chrysotile asbestos was processed in the same way as described in example 1, except than the hydroxylamine hydrochloride was replaced by 2 g of hydroxylamine sulfate (CAS Registry Number: 10039-54-0) and the ethylene-dinitrilo-tetraacetic acid was replaced by 1 g of oxalic acid dihydrate (CAS Registry Number: 6153-56-6). The yield was 0.5 g.

The infrared spectrum of the silica gel nanofibers that were so obtained showed the same bands and the same intensities as those of example 1. The characteristic band of chrysotile was absent from these nanofibers. Only bands characteristic of amorphous silica were present.

Figure 7:
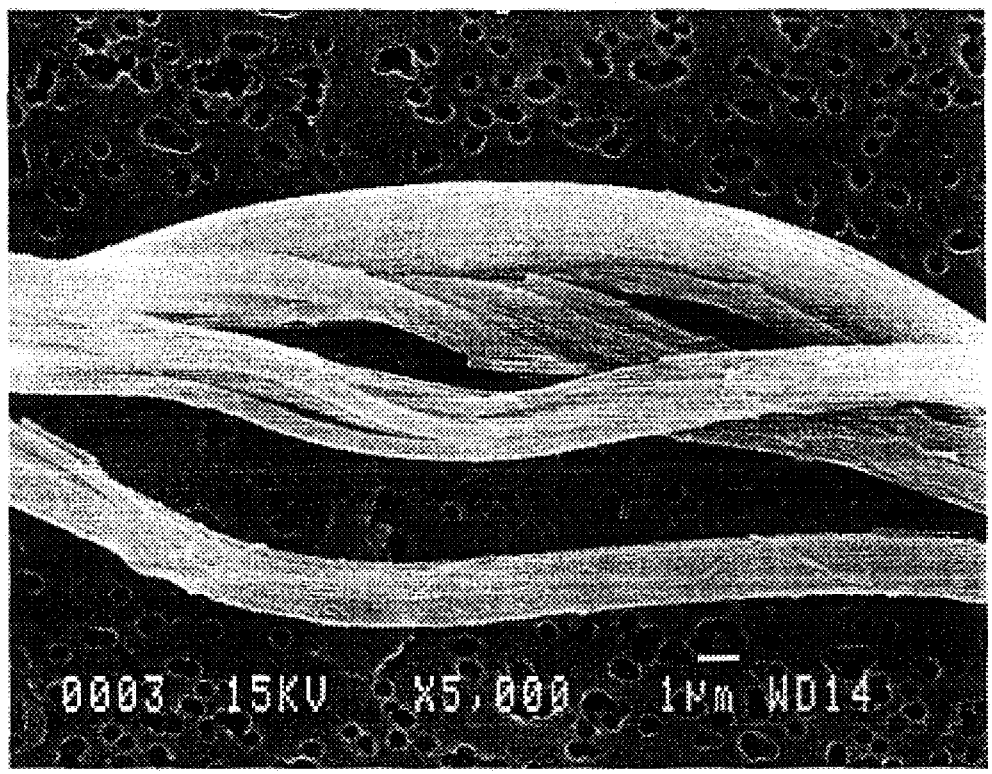
FIGS. 7 and 8 are scanning electron micrographs of a bundle of the silica gel nanofibers obtained in Example 1.

The scanning electron micrographs of these samples (see FIGS. 7 and 8) were similar to those of silica gel nanofibers obtained from crude chrysotile fibers. These microfibers had lengths in the millimeter range and diameters in the nanometer range.

Example 3

This example was carried out to show the capacity of loading catalytically active metals into pores of the silica gel nanofibers obtained in example 1. For this purpose, two different copper (II) solutions were used to impregnate silica gel nanofibers obtained under the process described in example 1. The first solution was a slightly acidic nitrate copper solution. The second one was alkaline ammonia copper solution. These solutions were brought in contact with the silica gel nanofibers at room temperature. A change in color on the nanofibers, from white to deep blue, took place rapidly. The impregnated silica gel nanofibers were filtered and dried at 120° C. The color of the impregnated fibers turned to light blue.

Figure 9:
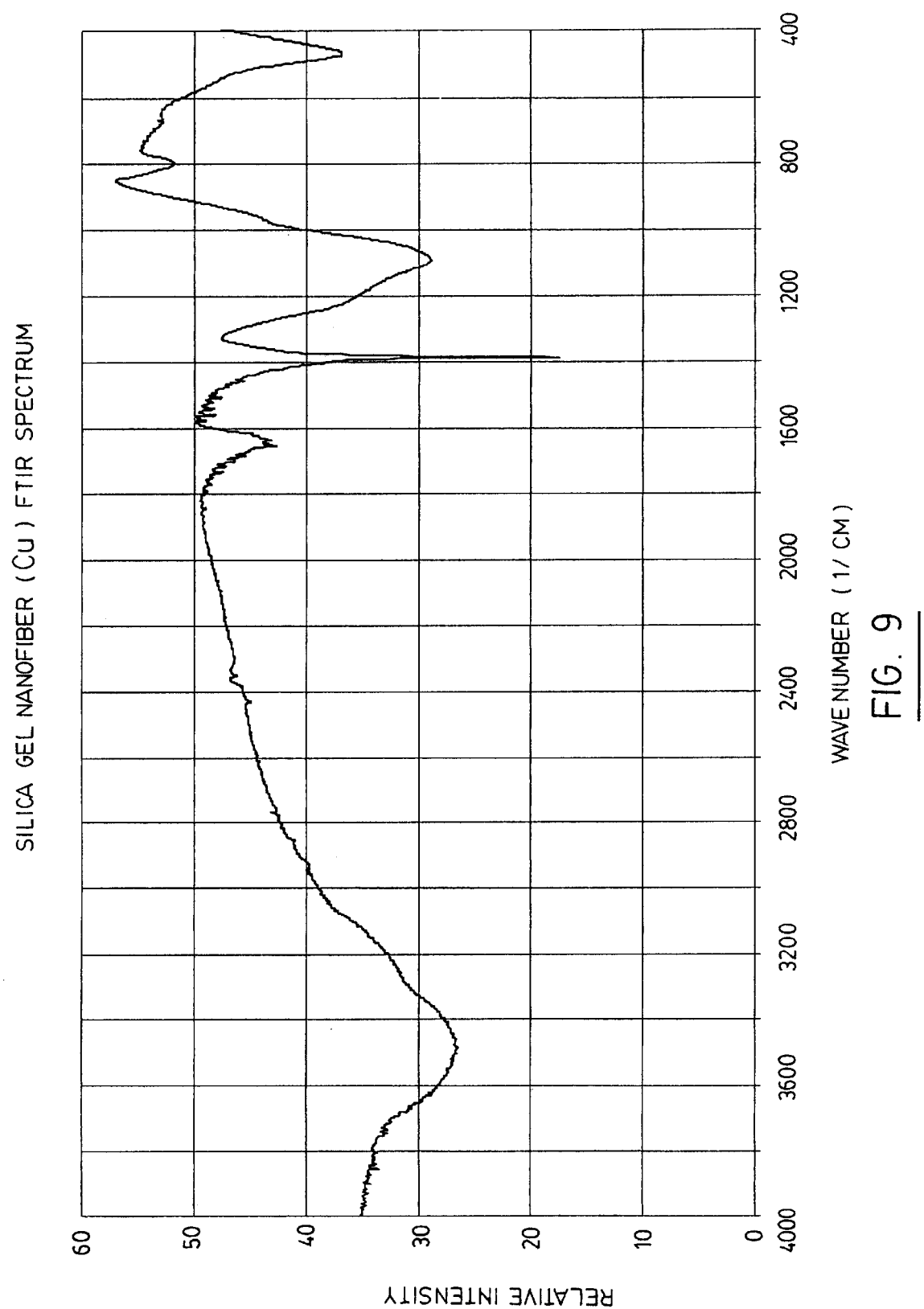
FIG. 9 is an infrared spectrum of the silica gel nanofibers obtained in Example 1 after treatment with an alkaline ammonia copper solution, as disclosed in Example 3.

The infrared spectrum (see FIG. 9) of the copper ammonia treated silica gel fibers contains the same bands as the silica gel fibers, with the addition of a strong narrow band located at about 1400 $cm^{-1}$. This band is due to excess of adsorbed copper ions. After thorough washing with water, the band at 1400 $cm^{-1}$ disappeared completely. The nanofibers remained blue with a content in copper of the order of 13%.

Adding hydrazine to a suspension of the copper impregnated nanofibers in water, and heating the solution at 80° C. during 30 minutes, reduced the copper (II) ions to metallic copper. Such was evidenced by the change of color of the fibers, from blue to a temporary yellow color to a darkish red color.

Impregnation of silver (I) ions, either in acid or alkaline solutions, did not modify the white color of the fibers, until the fibers were dried. The fibers were washed with water until disappearance of the infrared band at about 1400 $cm^{-1}$. After drying at 120° C. the fibers took a brown color. Chemical analysis gave a loading of about 10% silver on the silica gel fibers. Dipping in a solution containing hydrazine brought reduction of silver ions to metallic silver and a change of color of the nanofibers, from brown to dark.

Thus, the nanofibers according to the invention may actually be used as efficient supports for catalytic metals.

Example 4

250 mg of the silica gel nanofibers obtained as described in example 1 were heated during 12 hours at 250° C. 250 mg of the same nanofibers were also heated during 12 hours at 500° C. Loss of weight due to water evaporation was about 9% at 250° C. and 14% at 500° C. The white solids had the same appearance as the silica gel nanofibers of example 1. Elemental analysis gave a chemical composition between $SiO_2.H_2O$ and $SiO_2$.

Figure 10:
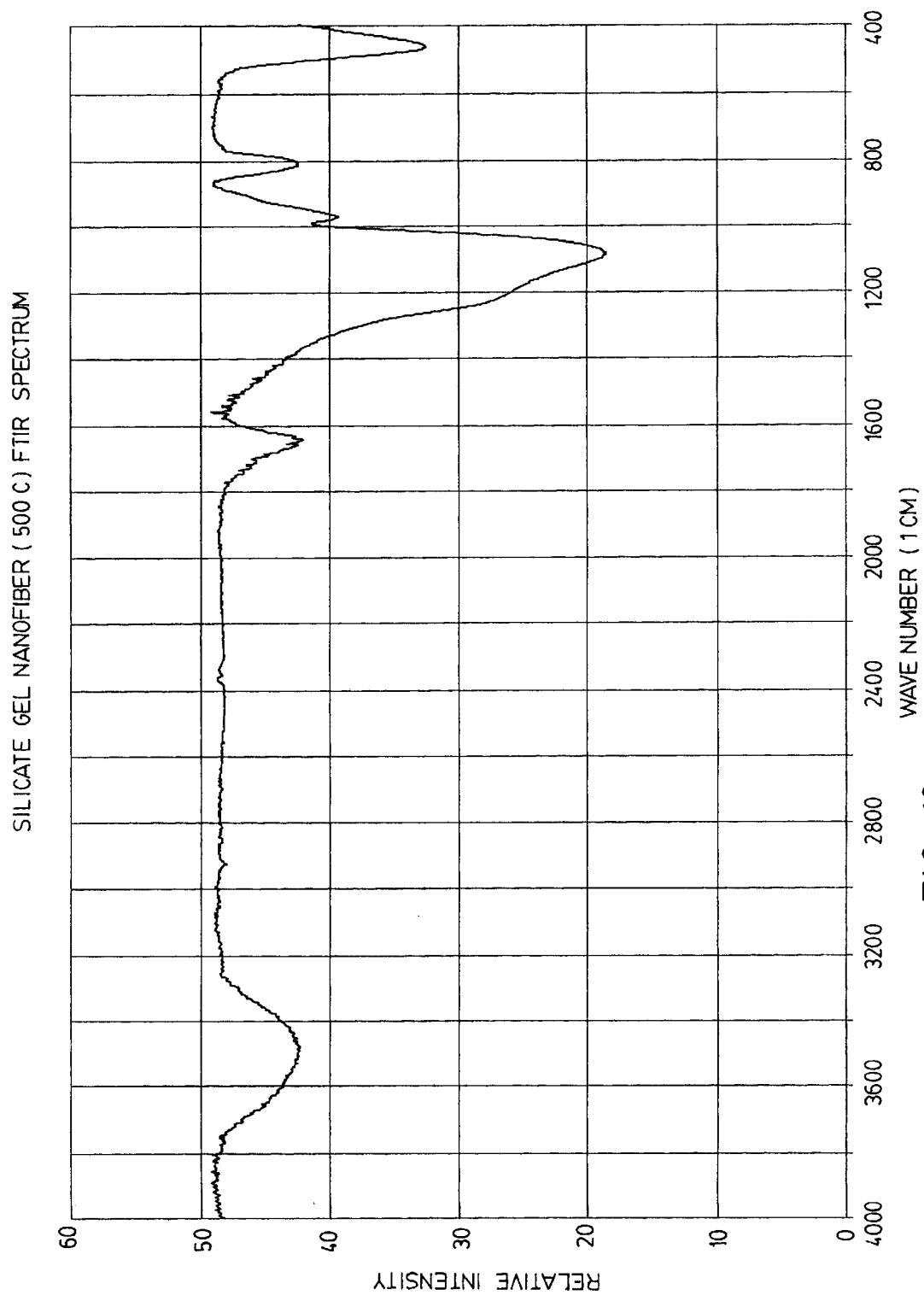
FIG. 10 is an infrared spectrum of the silica gel nanofibers heated at 500° C. for 12 hours, as disclosed in Example 4.

The infrared spectrum of the sample heated at 500° C. (see FIG. 10) showed the same bands as the sample heated at 250° C. and the silica gel nanofibers of example 1. A decrease in intensity in the peak at about 960 $cm^{-1}$ was noticeable as the temperature increases.

The adsorption-desorption of nitrogen on these silica gel nanofibers provided data from which the specific surface area was calculated at 690 and 680 $m^2/g$, respectively for the 250 and 500° C. samples. In both cases, the average diameter of the nanofibers was close to 4 nm with a distribution identical to that observed in example 1.

Figure 11:
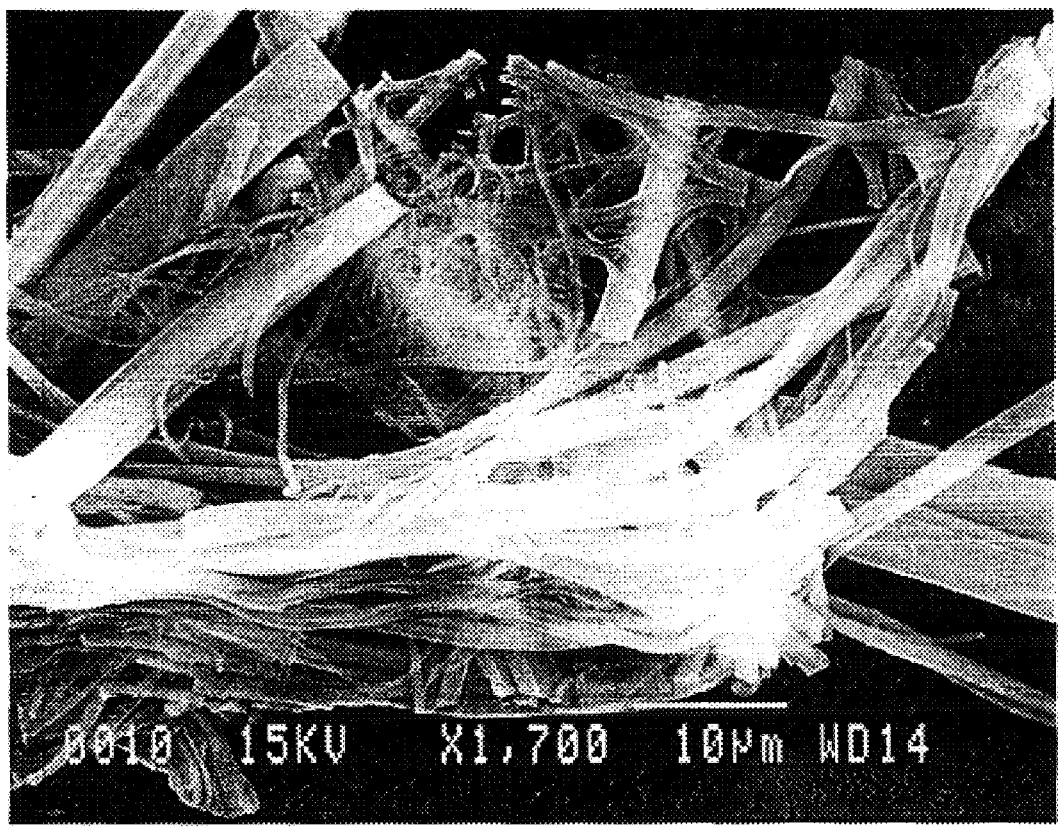
FIG. 11 is a scanning electron micrographs of the silica gel nanofibers heated at 500° C. for 12 hours, as disclosed in Example 4.

Scanning electron microscopy showed entangled nanofibers and small bundles of nanofibers (see FIG. 11) in the sample heated at 500° C. Scanning electron micrographs from the sample heated at 250° C. was not distinguishable from those of samples dried at 120° C. or heated at 500° C.

Example 5

250 mg of the silica gel nanofibers obtained as described in example 1 were heated at 1000° C. during 12 hours. Loss of weight due to water evaporation was close to 16%. The obtained white solid had the same appearance as the silica gel nanofibers. Elemental analysis gave a chemical composition corresponding to $SiO_2$. The so-obtained nanofibers were therefore designated as "silica glass nanofibers".

Figure 12:
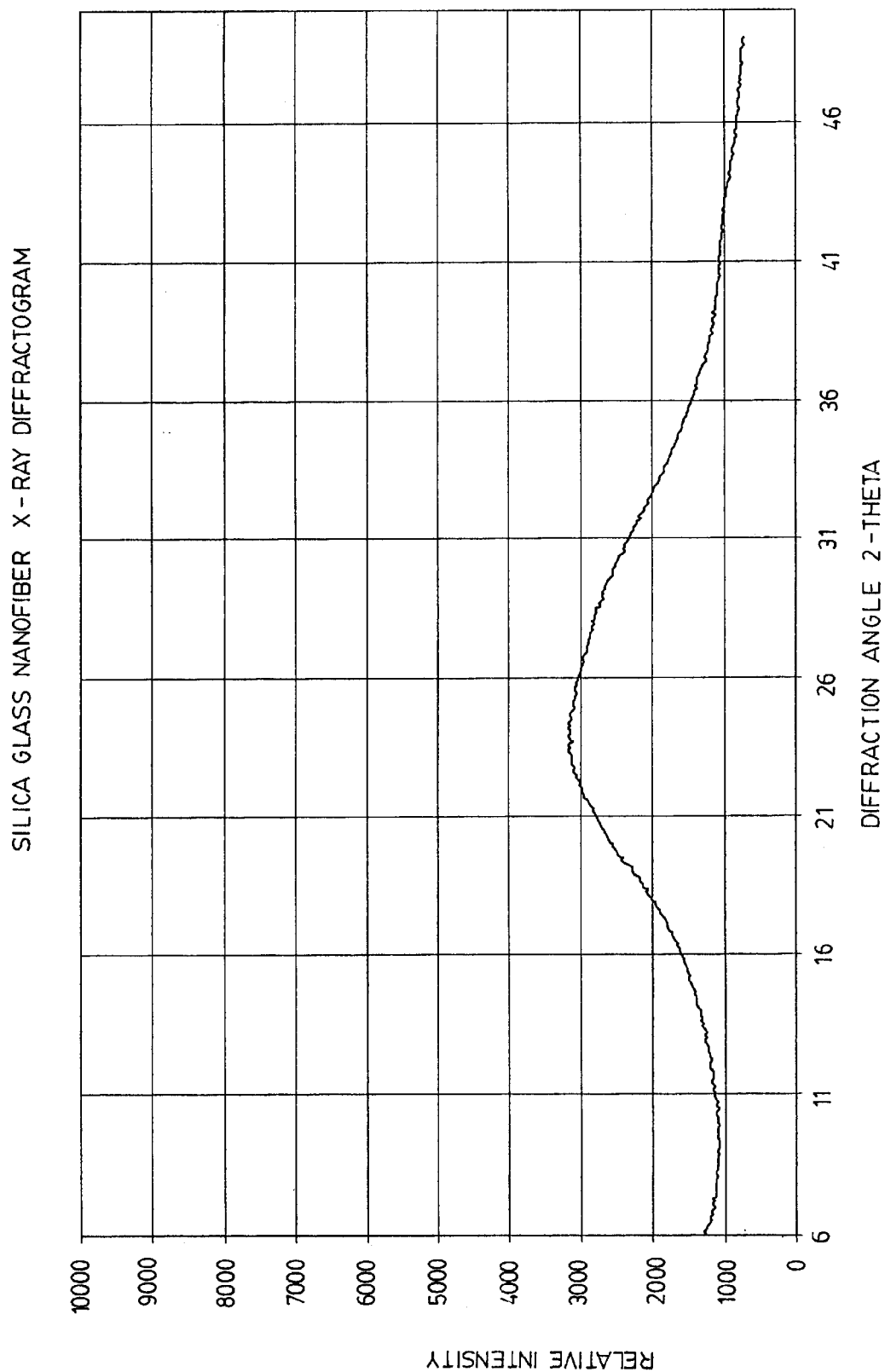
FIG. 12 is an X-ray diffraction pattern of the silica glass nanofibers obtained in Example 5.

The X-ray diffraction pattern was measured using the K-alpha line from Cu anticathode. The diffraction pattern shown in FIG. 12 contains no peaks but a large absorption band at the same angle as shown in the silica gel nanofiber sample. The obtained silica glass nanofibers were therefore amorphous.

Figure 13:
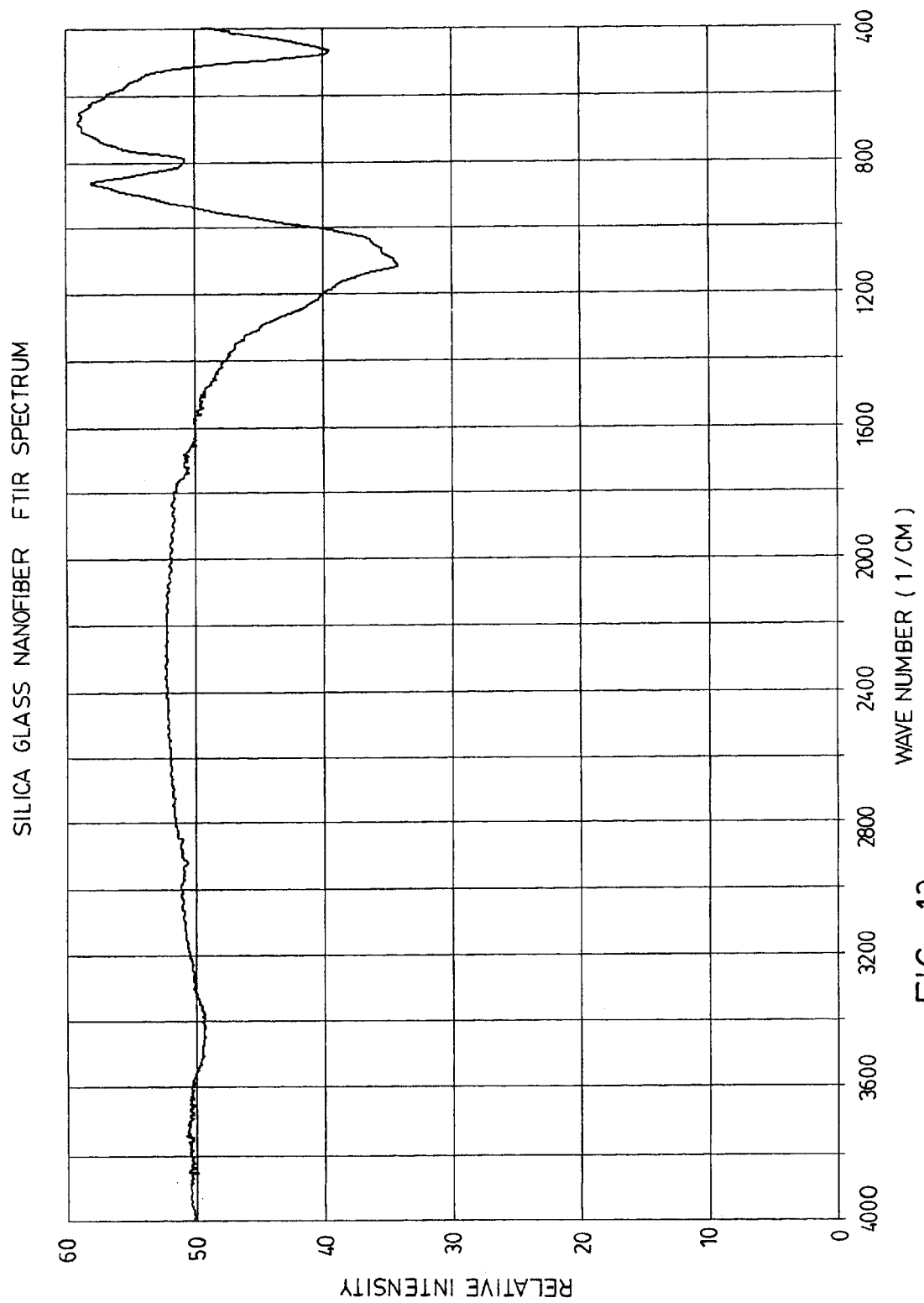
FIG. 13 is an infrared spectrum of the silica glass nanofibers obtained in Example 5.

The infrared analysis of the silica glass nanofibers showed only the group of bands assigned to silica (see FIG. 13). The bands at 470, 800 and 1100 $cm^{-1}$ are similar in shape to those of the silica gel nanofibers but the band in the region of 960 $cm^{-1}$ is absent. The water bands in the regions 1650 and 3500 $cm^{-1}$ are also absent.

The adsorption-desorption of nitrogen on these silica glass nanofibers led to data from which the specific surface area was calculated at 11 $m^2/g$. The small number of pores had diameters close to 4 nm.

Figure 14:
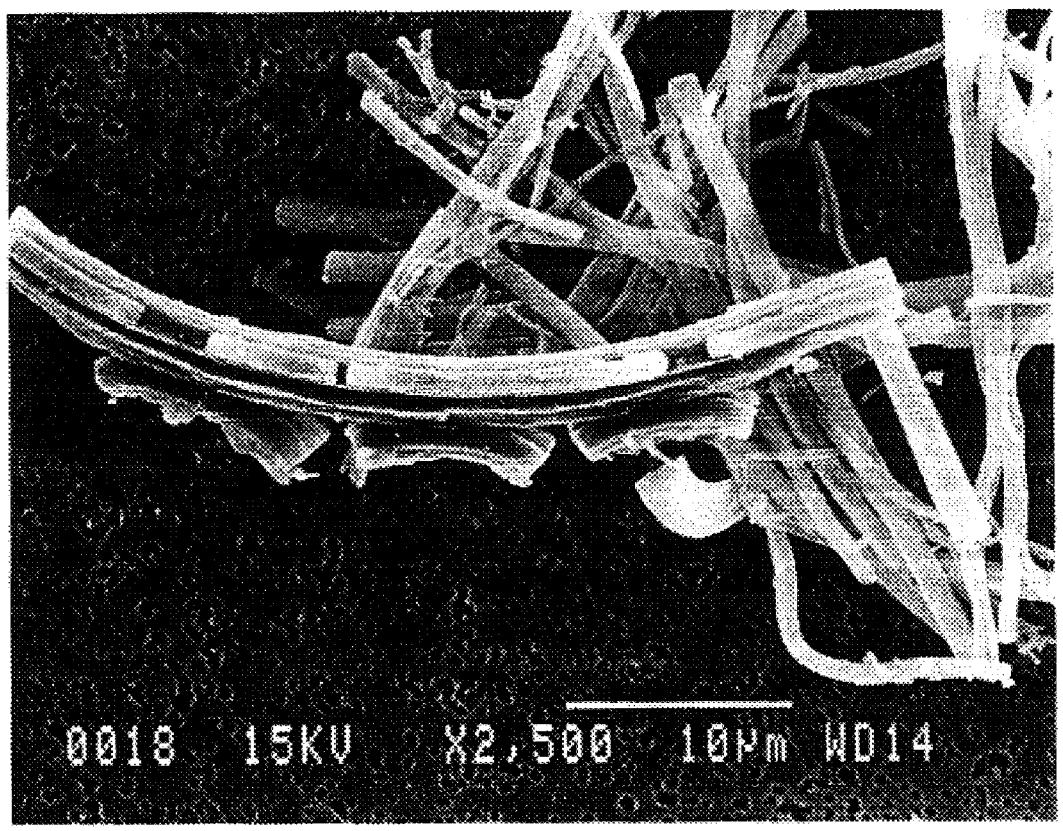
FIG. 14 is a scanning electron micrographs of the silica glass nanofibers obtained in Example 5.
Figure 15:
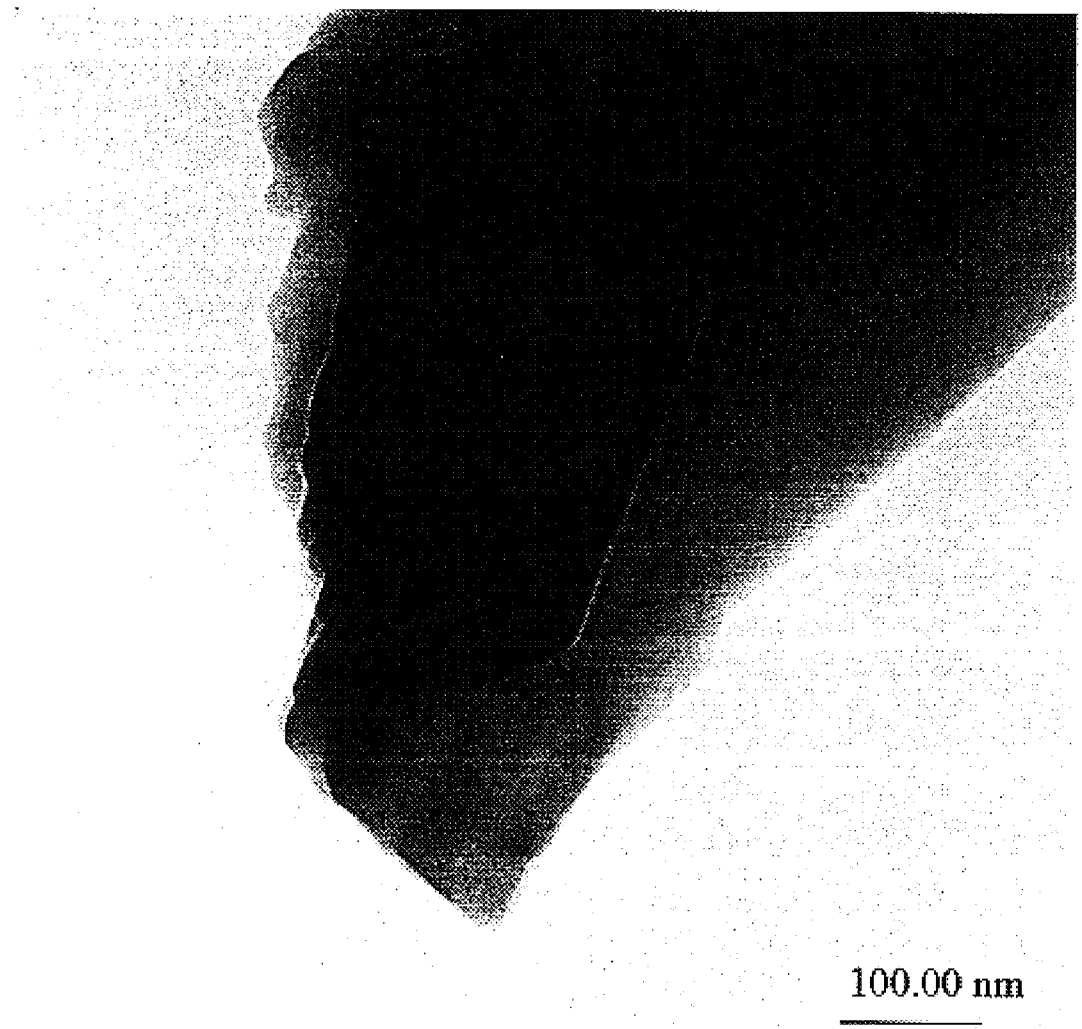

Scanning electron micrography (see FIG. 14) showed silica glass nanofibers together with broken and burst fibers. Nanodebris could be seen by high resolution transmission electron micrography (see FIG. 15).

Example 6

250 mg of the silica gel nanofibers obtained as described in example 1 were progressively and slowly heated from room temperature to 1000° C., and kept at 1000° C. during 12 hours. Loss of weight due to water evaporation was of about 16%. No change in appearance from the starting silica gel nanofibers was noticeable. Chemical analysis corresponded to the compound $SiO_2$. The appearance of these silica glass nanofibers was similar to that of the sample in example 5, as was its infrared spectrum.

Figure 16:
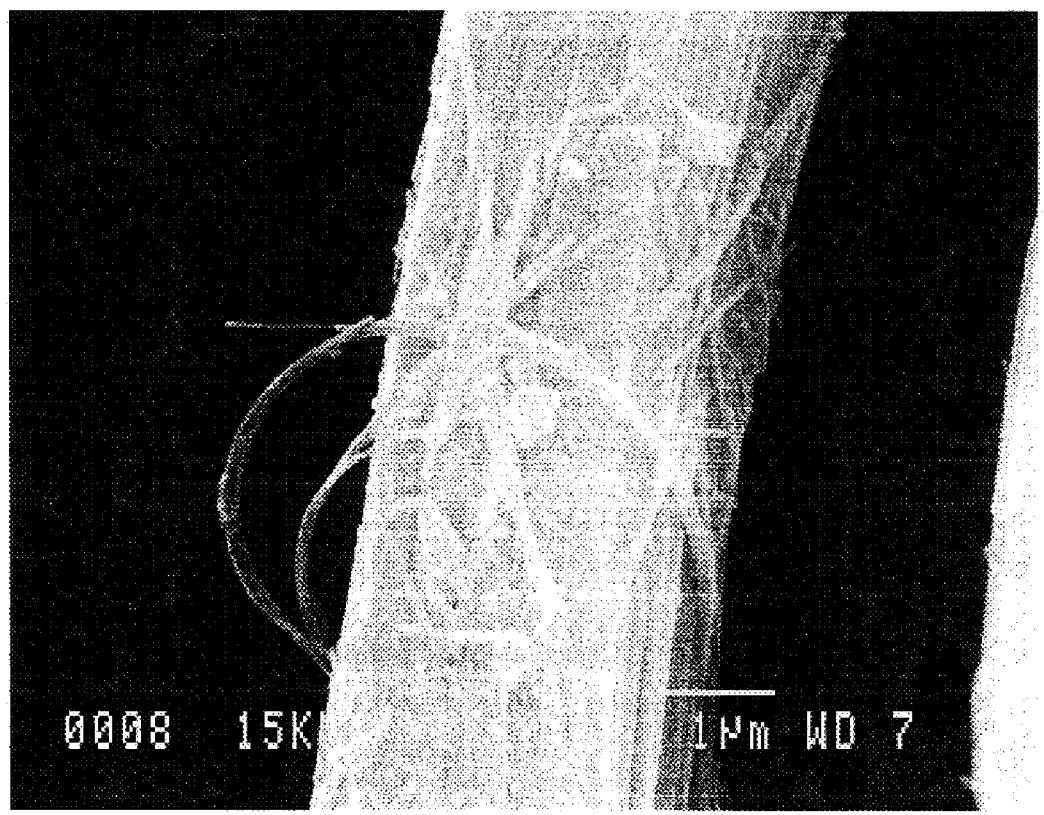
FIGS. 16 and 17 are scanning electron micrographs of the silica glass nanofibers obtained in Example 6.

Scanning electron micrography of these silica glass nanofibers differed from those of example 5. They did not contain any burst fiber and the silica glass nanofibers appeared to have retained the morphology of the silica gel nanofibers (FIG. 16 and FIG. 17).

Thus, slowly heating of the silica gel nanofibers seems to prevent rupture in the fibers by permitting a gradual dissociation of water. The loss of water is accompanied by a loss in porosity but not in morphology during the transformation of silica gel nanofibers into silica glass nanofibers.

Figure 4:
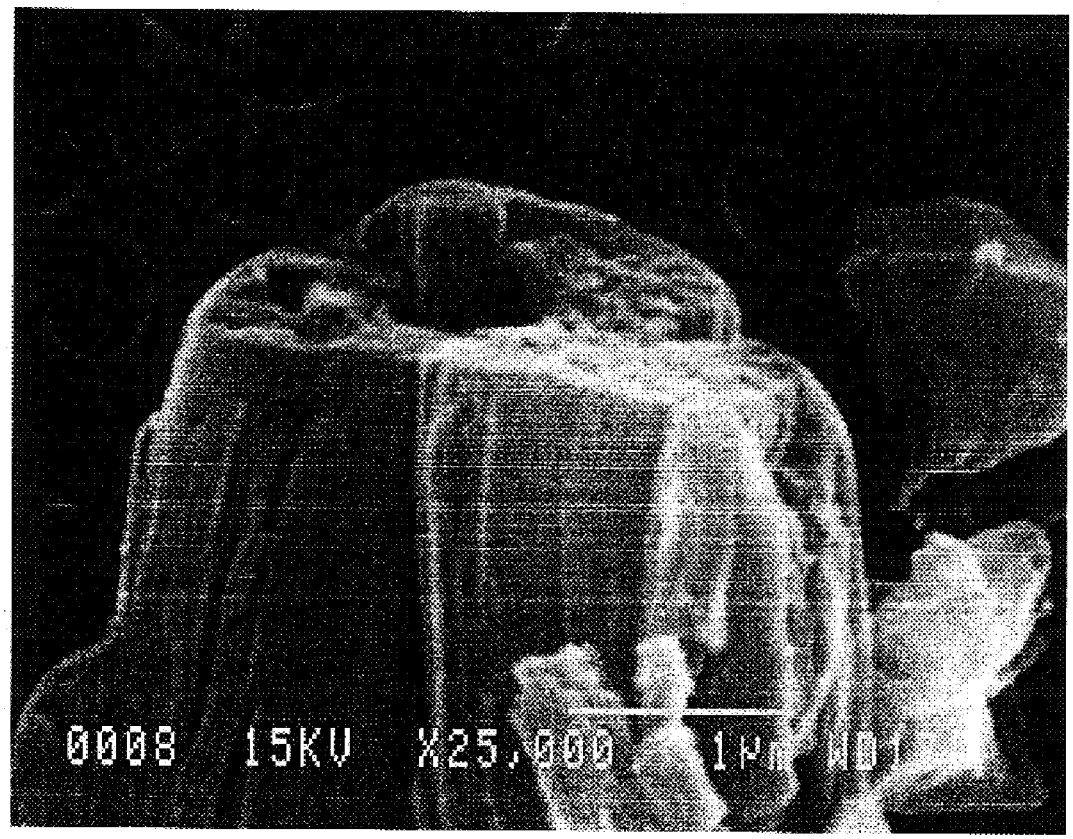
Figure 8:
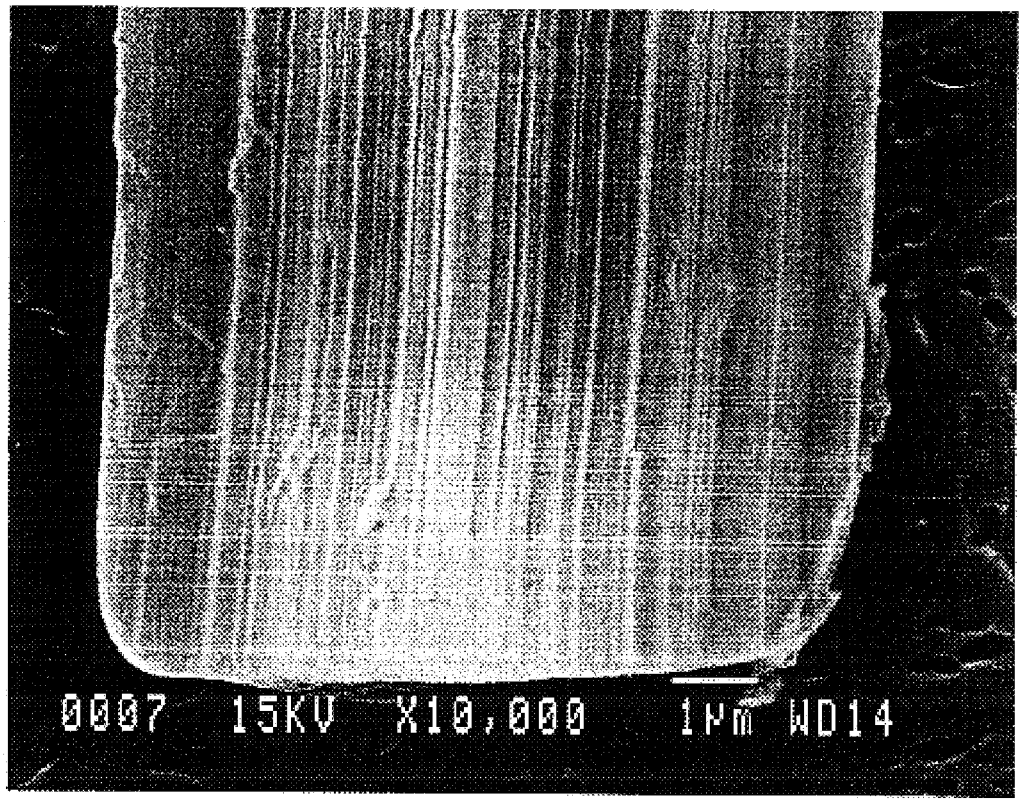
Figure 17:
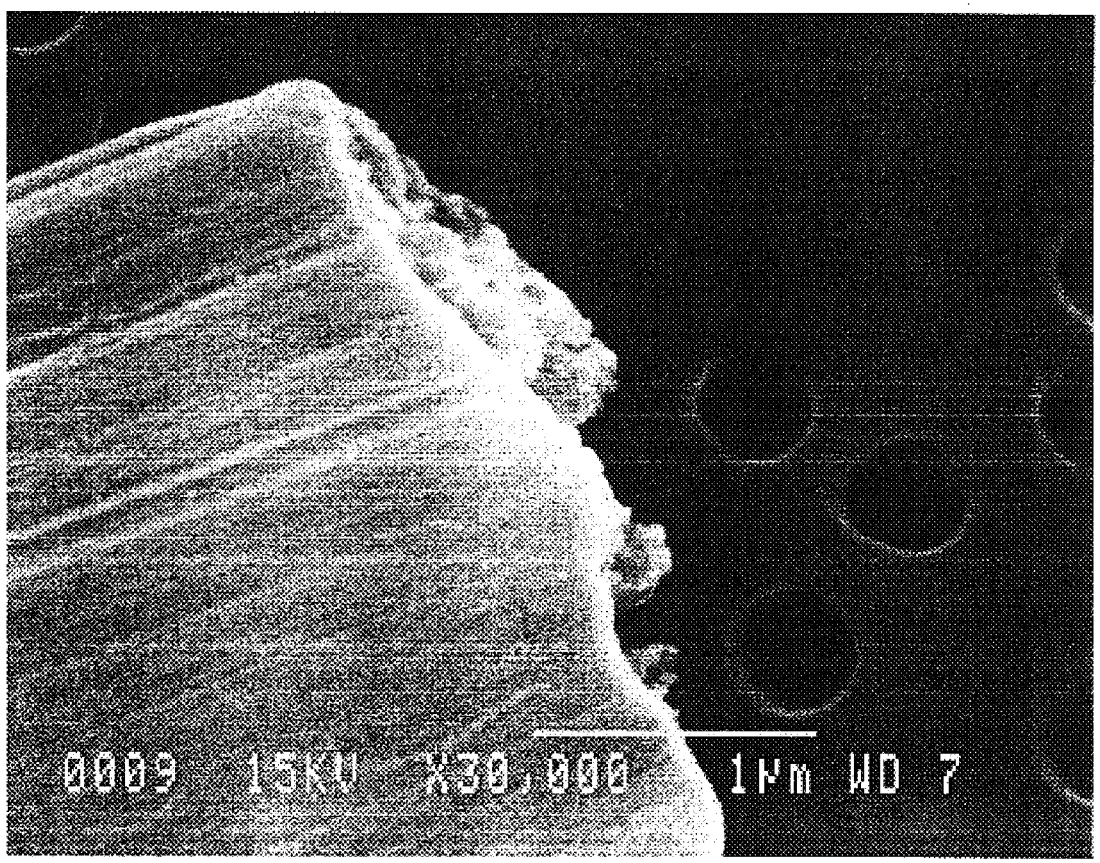

The diameter of the silica glass nanofibers can be evaluated by comparing FIG. 17 with FIG. 4 and FIG. 8 of silica gel nanofibers. A diameter of less than 30 nm can be attributed to these glass nanofibers.

Example 7

Figure 18:
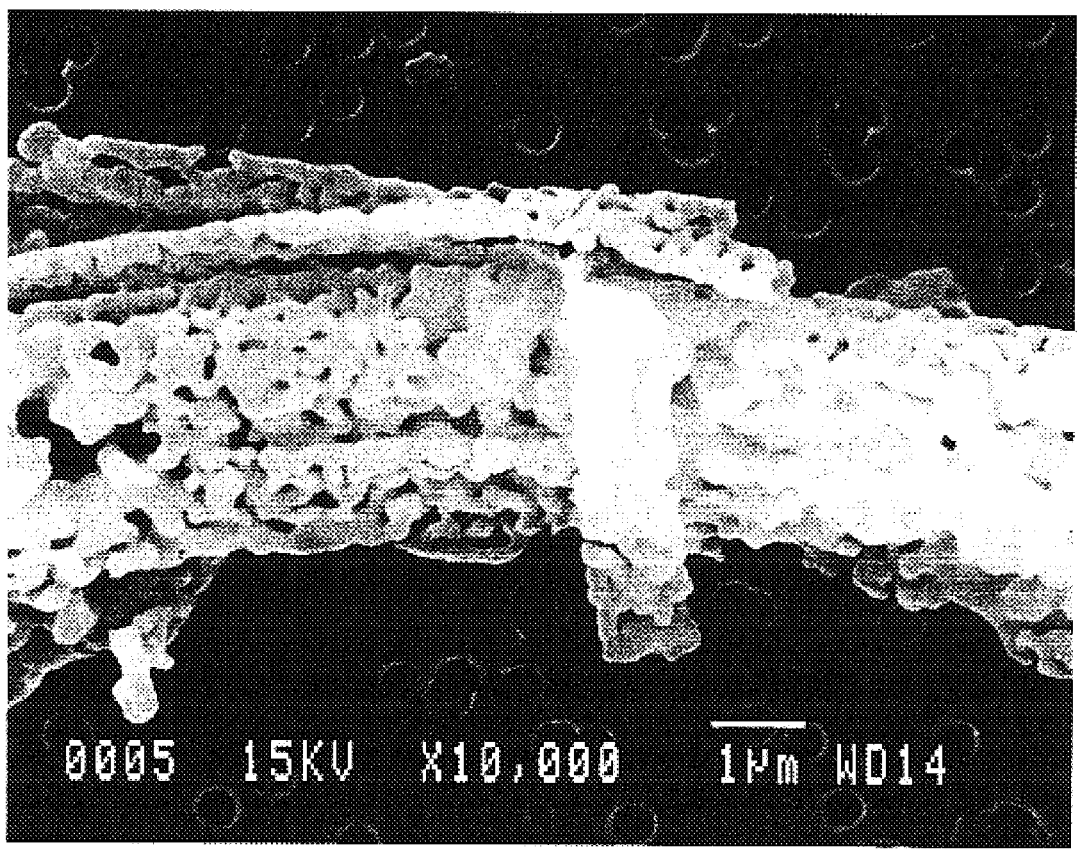
FIGS. 18 and 19 are scanning electron micrographs of the nanofibers obtained in Example 7.
Figure 19:
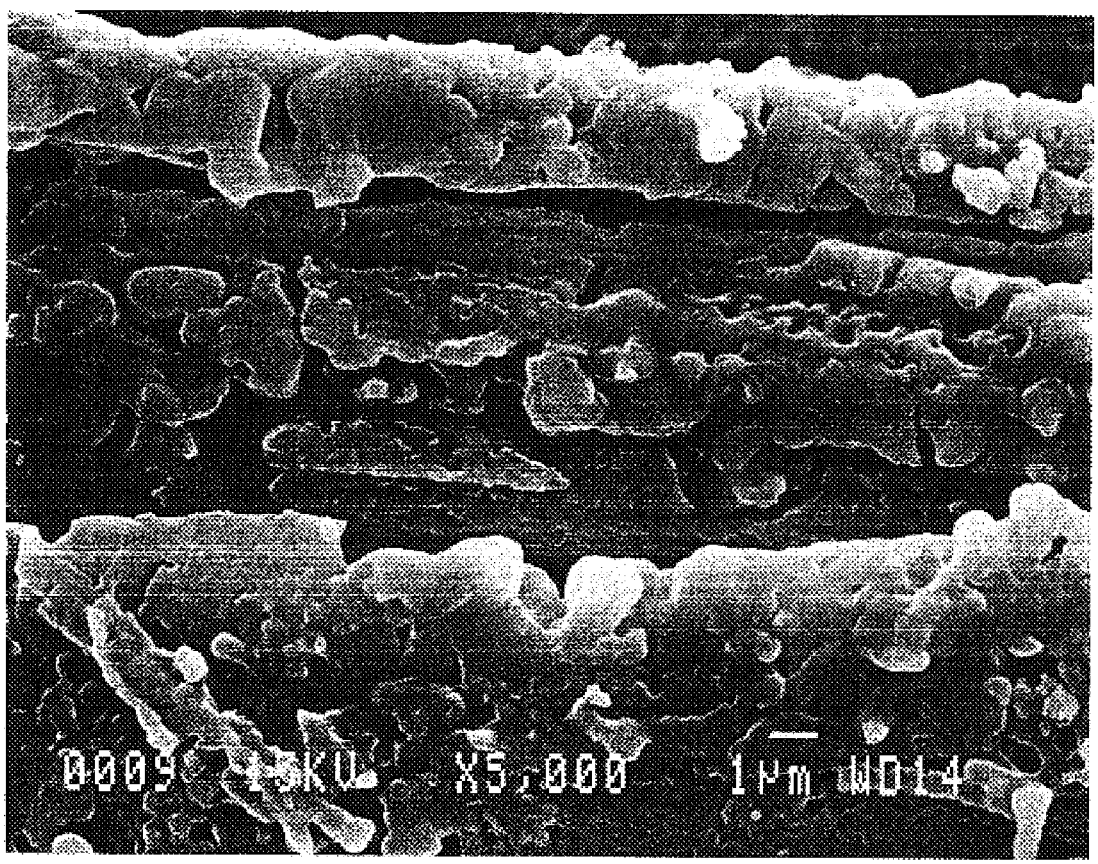
Figure 20:
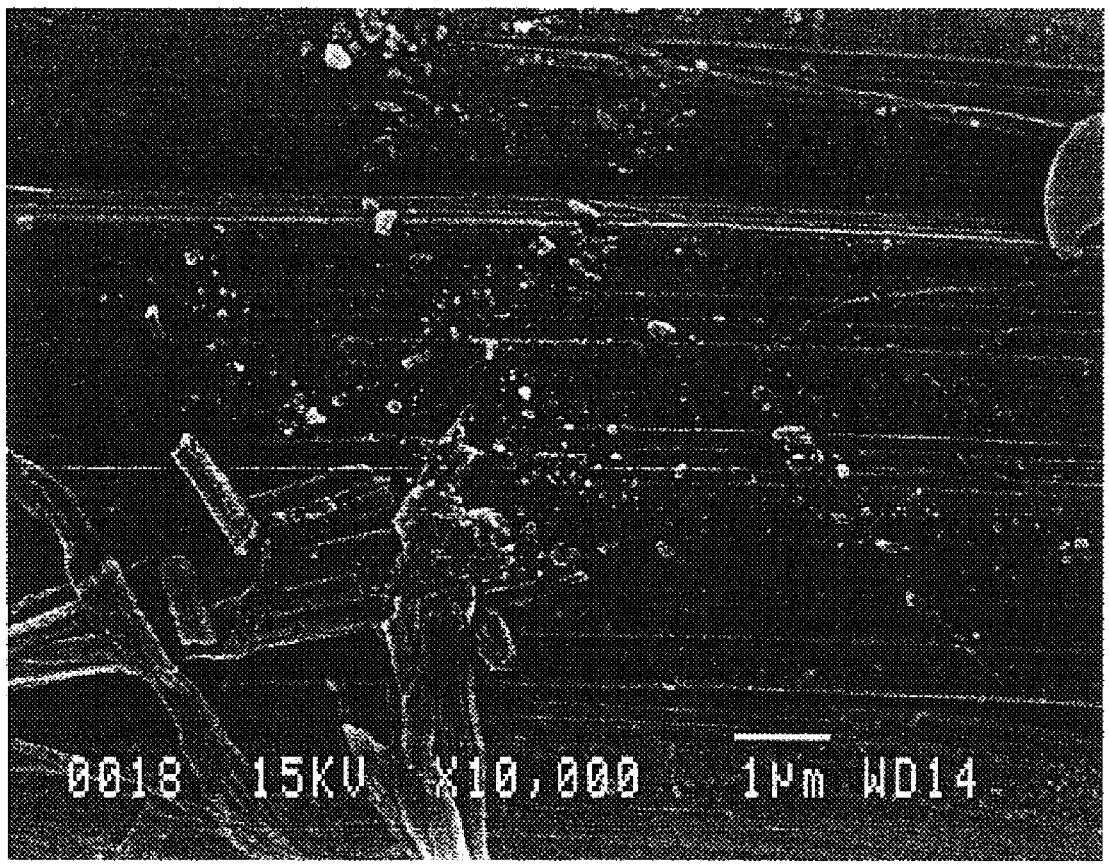
FIG. 20 is a scanning electron micrograph of the nanofibers obtained in Example 8.

50 mg of the silica gel nanofibers obtained by the process disclosed in example 1 were tumbled in a solution containing 300 mg of silver (I) ions and 200 mg of ammonium hydroxide, during 10 minutes at room temperature. The white nanofibers were filtered and washed with water. They were thereafter dispersed in a solution containing 50 mg of hydrazine and left to react during 30 minutes at about 80° C. The silver embedded dark nanofibers were slowly heated at 500° C. and maintained at that temperature for 12 hours. The color of the fibers had faded to yellow. The nanofibers were thereafter heated and kept at 800° C. during 12 hours. These nanofibers were yellowish and had the st5ructure shown on FIG. 18. Heating the nanofibers at 1000° C. during 12 hours resulted in white nanofibers, having the structure shown in FIG. 19. The chemical analysis revealed only traces of silver in the silica glass nanofibers. The structure of these silica glass nanofibers is markedly different from that of all other examples.

Example 8

50 mg of the silica gel nanofibers obtained by the process disclosed in example 1 were tumbled in a solution containing 300 mg of copper (II) ions and 500 m g of ammonium hydroxide, during 10 minutes at room temperature. The blue nanofibers were filtered and washed with water. They were thereafter dispersed in a solution containing 50 mg of hydrazine and left to react during 30 minutes at about 80° C. The final product was dark red and showed the only infrared bands appearing on FIG. 8. The impregnated copper nanofibers were slowly heated at 1000° C. and maintained at that temperature during 12 hours. The nanofibers turned from red to dark. Digestion in boiling hydrochloric acid or nitric acid solutions dissolved small amounts of silicon and copper but left a dark colored residue making up more than 80% of the in initial weight. Digestion of the dark residue in hydrofluoric acid lead to total dissolution. From the concentration of dissolved copper, the percentage of encapsulated copper was calculated to be equal to about 6%.

What is claimed is:

1. A method for preparing silica gel-nanofibers, comprising the steps of heating chrysotile asbestos in an aqueous solution containing at least one controlled proton-releasing agent and at least one cation-complexing agent, and subsequently recovering the silica gel nanofibers that have been obtained during the heating step from the aqueous solution.

2. The method of claim 1, wherein:
   the at least one controlled proton-releasing agent, is a weak hydrogen ion-releasing compound having a dissociation constant ranging from about 4 to 7 on the $pK_a$ scale; and the at least one cation-complexing agent, is a chemical agent that has a dissociation constant greater than about 5 at the $pK_a$ scale and that forms water soluble complexes with divalent and trivalent transition cations found in chrysotile.

3. The method of claim 2, wherein:

the weak hydrogen ion-releasing agent is used in such an amount that the available hydrogen ions are at least 100 times the number of magnesium ions in the chrysotile asbestos and the pH of the solution does not fluctuate by more than 1 during the heating; and the cation-complexing agent is used in such an amount that it exceeds by a factor of 3 to 10 the quantity of transition ions in the chrysotile asbestos.

4. The method of claim 3, wherein the heating step is carried out at a temperature of 60 to 100° C.

5. The method of claim 4, wherein the aqueous solution that is used has a pH ranging between 2 to 6.

6. The method of claim 5, wherein the chrysotile asbestos and the aqueous solution are used in such amounts that the weight ratio of said chrysotile asbestos to water ranges from 1/1000 to 5/1000.

7. The method of claim 6, wherein the heating step is carried out for 7 to 20 hours.

8. The method of claim 7, wherein said recovering step comprises a filtration and a drying under vacuum.

9. A method for preparing silica glass nanofibers, comprising the steps of heating chrysotile asbestos in an aqueous solution containing at least one controlled proton-releasing agent and at least one cation-complexing agent, subsequently recovering from the aqueous solution the silica gel nanofibers that have been obtained during the heating step, and heating said silica gel nanofibers at a temperature ranging from 900 to 1200° C.

10. The method of claim 9, wherein said heating of the silica gel nanofibers is carried out for 4 to 15 h.

11. The method of claim 10, wherein said heating of the silica gel nanofibers is carried out in such a manner as to slowly reach said temperature.

12. The method of claim 9, wherein said heating of the silica gel nanofibers is carried out at a temperature close to 1000° C. for 12 hours.

* * * * *